Patented Feb. 14, 1933

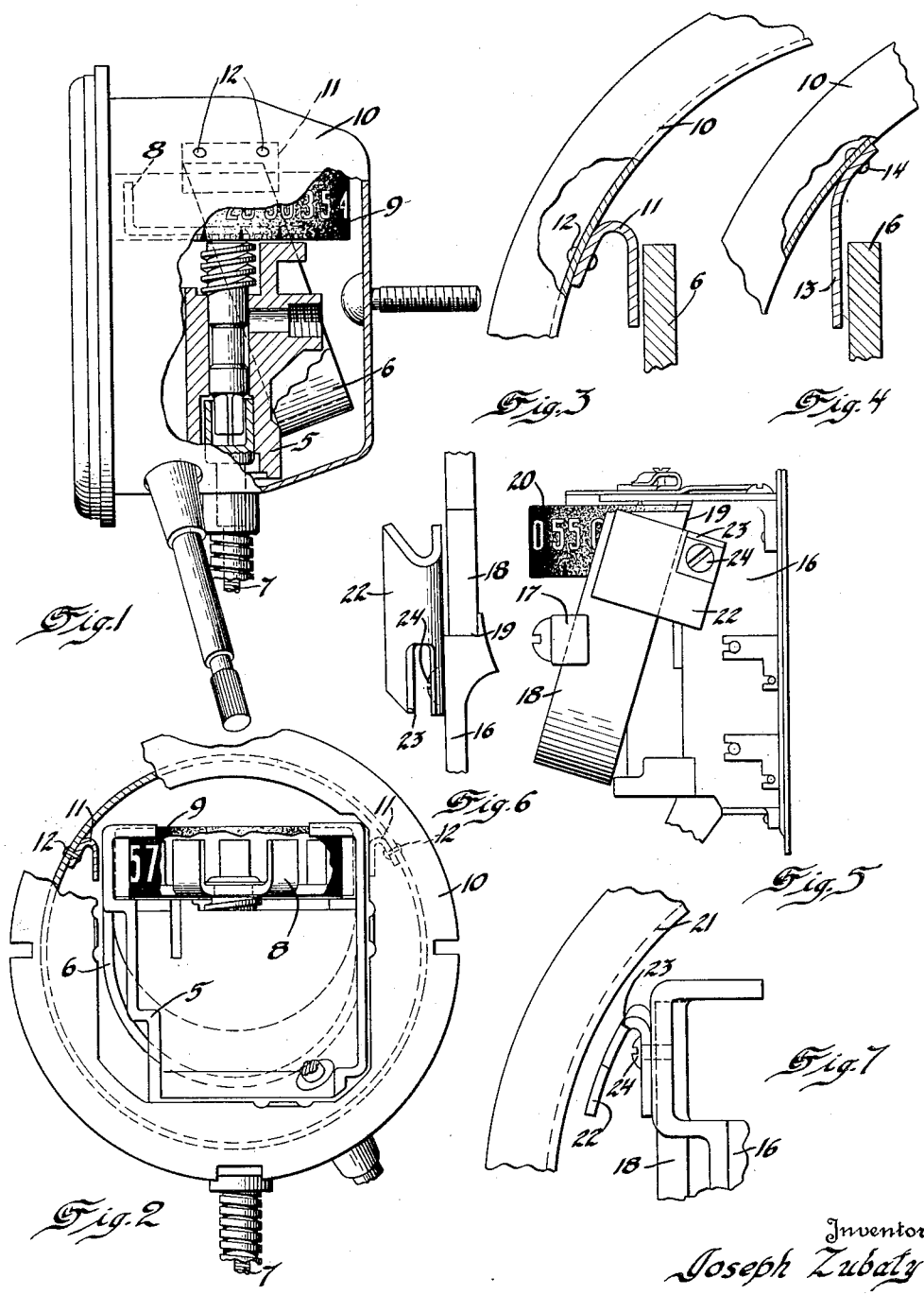

1,897,965

UNITED STATES PATENT OFFICE

JOSEPH ZUBATY, OF FLINT, MICHIGAN, ASSIGNOR TO A C SPARK PLUG COMPANY, OF FLINT, MICHIGAN, A COMPANY OF MICHIGAN

TEMPERATURE COMPENSATED SPEEDOMETER

Application filed February 11, 1928. Serial No. 253,655.

This invention relates to magnetic measuring instruments, in general, particularly, to magnetic speedometers, and, more particularly, to means for making the indications of such instruments independent of variations in temperature.

Speedometers of the type mentioned consist essentially of a magnet and an armature, either or both of which are adapted to be driven, directly or indirectly, from the shaft whose speed is to be measured, and a drag element positioned in the magnetic field between the magnet and the armature and adapted to be displaced from its position of rest a distance proportional to the speed of rotation of the shaft.

An instrument of the general type described above gives quite accurate speed indications when operated at the temperature at which it is calibrated. But if it is operated at temperatures appreciably above or below that at which it is calibrated the speed indications will be considerably in error. This error is caused by the fact that, while the strength of the magnetic field between the poles of the magnet and the armature remains substantially constant within the range of temperatures to be considered, the electrical resistance of the material of which the drag element is made changes very considerably with changes in temperature.

The indications of an instrument of the type described will be unaffected by temperature changes if neither the electrical resistance of the drag element nor the strength of the magnetic field passing through the drag element varies with changes in temperature. Since, as has been stated, the strength of the magnetic field passing through the drag element is practically constant throughout the temperature range to be considered, this condition can be fulfilled by making the drag element of a material or combination of materials having a temperature coefficient of electrical resistance approaching zero. Such materials exist but their electrical resistance is so high as to make their use in an instrument of this type impractical.

For the reason given above, it has become a common expedient to make the drag elements of a material having a low electrical resistance with the accompanying relatively high temperature coefficient of electrical resistance. The indications of such an instrument will be unaffected by temperature changes if the strength of the magnetic field passing through the drag element thereof is caused to vary in such a manner as to compensate for the changes in resistance of the drag element. This, of course, means that the strength of the magnetic field passing through the drag element must vary directly with the resistance of the drag element. Several means of accomplishing this end have been proposed.

If a piece of magnetic material is positioned so as to shunt part of the magnetic field of the magnet away from the drag element, and the piece of magnetic material has a negative temperature coefficient of magnetic permeability, the result will be that as the temperature increases less of the flux from the magnet will flow into the shunt and more through the drag element and as the temperature decreases more of the flux from the magnet will flow into the shunt and less through the drag element. The use of such a shunt will, therefore, tend to compensate the instrument for temperature changes.

Several magnetic materials having appreciable negative temperature coefficients of permeability are known, among which are certain alloys of nickel and iron and certain alloys of nickel and copper. The temperature-permeability curves of both of these alloys vary considerably with their composition. The particular alloy which should be used as a shunt with any given instrument will, of course, depend upon the temperature-resistance characteristics of the material of which the drag element is made, and the amount of the alloy to be used will depend upon the strength of the magnet and the position of the shunt relative to the poles of the magnet.

It is an object of this invention to provide a temperature compensated instrument of the class described.

More specifically, it is an object of the invention to provide, in a magnetic measuring instrument, a magnetic shunt, or shunts, adjacent one or both poles of the magnet, having such temperature-permeability characteristics as to counteract the effects of the variation in electrical resistance of the drag element on the indications of the instrument.

Other objects of the invention will be apparent from a perusal of the following description of the embodiments of my invention which are shown in the accompanying drawing, in which:

Figure 1 is a side elevation, with parts broken away and in section, of a speedometer in which is embodied my invention;

Figure 2 is a front elevation, with parts broken away and in section, of the instrument shown in Figure 1 with the dial and bezel removed.

Figure 3 is a fragmentary front elevation, on an enlarged scale, with parts broken away and in section, of the instrument shown in Figures 1 and 2 with the dial and bezel removed, and showing the position of one of the compensators relative to the adjacent pole of the magnet.

Figure 4 is a view similar to Figure 3, but showing a second form of compensator.

Figure 5 is a side elevation of a speedometer, similar to that shown in the preceding figures, with the case removed, and provided with a third form of compensator.

Figure 6 is a fragmentary top plan view, on an enlarged scale, of the instrument shown in Figure 5.

Figure 7 is a fragmentary front elevation, on an enlarged scale, of the instrument shown in Figures 5 and 6 with parts removed, and showing the position of the compensator relative to the adjacent pole of the magnet.

Referring to Figures 1–3 of the drawing, the reference character 5 indicates a frame of non-magnetic material to which is rigidly fastened in any suitable manner a permanent horseshoe magnet 6. Pivotally mounted on the frame, located between the poles of the magnet, and adapted to be rotated by a rotating shaft of the vehicle through the flexible shaft 7 is the rotor 8 which is preferably made of low-carbon steel. The speed-cup 9, which is preferably made of an aluminum-magnesium alloy, is also pivotally mounted on the frame and is provided with a circumferential flange or skirt which is located between the rotor and the poles of the magnet and carries the speed indicating characters. A hairspring (not shown), which is connected to the speed-cup and frame in the usual or any desired manner, is provided to return the speed-cup to its position of rest when movement of the vehicle ceases. The frame and the parts mounted thereon are all enclosed in a case 10 of magnetic material, preferably iron, or soft, low-carbon steel, through which the flexible shaft 7 projects. The poles of the magnet are, as shown in the drawing, located in close proximity to the case 10.

At two points, one substantially opposite each pole of the magnet, there is provided between the case 10 and the magnet a U-shaped shunt or compensator 11 which is of slightly greater width than the leg of the magnet, and is made of a magnetic material having a negative temperature coefficient of magnetic permeability. One of the legs of each of the shunts or compensators is secured to the case 10 by a rivet 12, and the other leg extends between the first leg and the adjacent leg of the magnet. The second leg of the shunt or compensator is arranged parallel to and adjacent the leg of the magnet, but is slightly spaced therefrom so as to leave an air gap between the two parts.

With a speed-cup made of an aluminum-magnesium alloy, it has been found that a shunt or compensator made of an alloy containing approximately 70 percent nickel and 30 percent copper gives satisfactory results, reducing the error in the indications of the instrument caused by temperature changes to a negligible amount.

In some cases, a single shunt will be found sufficient to compensate the instrument for temperature changes. In this event, it will be unnecessary to use two of the shunts.

The speedometer, which is fragmentarily shown in Figure 4, is similar to that shown in Figures 1–3 differing therefrom only in the disposition of the shunt or compensator. In Figure 4, as in Figures 1–3, the reference character 10 indicates the case of the instrument and the reference character 6 the magnet. The reference character 13 indicates a shunt or compensator which is secured at its upper end to the case 10 at a point directly above one leg of the magnet by the rivet 14. The shunt or compensator extends outwardly and downwardly and then straight downwardly between the case and the adjacent leg of the magnet to a point considerably below the top of the latter. The shunt or compensator is of slightly greater width than the leg of the magnet and the portion thereof between the case and the leg of the magnet and below the top of the latter is, as may be seen in the drawing, parallel with, adjacent, and slightly spaced from the leg of the magnet so as to leave an air gap between the two parts.

It is to be understood that a second shunt or compensator will, or may, be positioned between the other leg of the magnet and the case.

Referring to the modification shown in Figures 5–7 of the drawing, the reference character 16 indicates a frame of non-magnetic material to which is rigidly secured by the bracket 17 a permanent horseshoe magnet 18, the free ends of whose legs rest in rabbets 19, which are of greater depth than the thickness of the legs, in the frame. Of similar construction and of the same materials and mounted on the frame 16 in a manner similar to that in which the corresponding parts of the instruments which are shown in Figures 1–4 are mounted on the frame 5 are the rotor (not shown), which is adapted to be driven by a flexible shaft similar to the part 7 which is shown in Figures 1–4, the speed-cup 20, and the hairspring (not shown) to return the speed-cup to its position of rest when movement of the vehicle ceases. The frame and the parts mounted thereon are all enclosed in a case 21 of iron, or soft, low-carbon steel, through which the flexible shaft projects. The poles of the magnet are, as indicated in Figure 7, located in close proximity to the case 21.

One of the legs of a U-shaped shunt or compensator 22 is secured to the frame 16 adjacent one of the rabbets 19, and extends between the case 21 and the adjacent leg of the magnet 18 parallel to the latter and spaced slightly outwardly therefrom by reason of the fact that the depth of the rabbet is greater than the thickness of the leg of the magnet. The other leg of the shunt or compensator is positioned between the first leg and the case 21 and is substantially parallel to and is spaced slightly inwardly from the latter. A portion of the outer leg of the shunt or compensator is cut away, as indicated at 23, to allow access to the head of the screw 24 which passes through the inner leg and into the frame and secures the shunt or compensator rigidly to the frame. The shunt or compensator 22 may be made of any suitable magnetic material having a negative temperature coefficient of magnetic permeability such, for instance, as one of the alloys previously mentioned.

It will be noted that in each of the constructions shown the shunt or compensator is located between a pole of the magnet and the case, i. e., in the path by which the greater proportion of the flux which is shunted by the case travels between the magnet and the case, and is, therefore, in a position to cause the most effective temperature compensation.

It is to be understood that, although I have shown and described specific constructions and have mentioned suitable materials, this has been done, not with a view to limiting the invention thereto, but merely by way of example and that my invention is not limited to use with the particular speedometers described or even to use with speedometers, but is also applicable to many other electrical measuring instruments.

I claim:
1. In a magnetic measuring instrument, a case, a frame within the case, a U-shaped magnet within the case and secured to the frame with its legs seated in rabbets in the frame in close proximity to but spaced from the case, a member in the magnetic field of the magnet and adapted to be influenced thereby to effect indications of the instrument, and means to vary the magnetic flux influencing said member including a U-shaped member of magnetic material having an appreciable temperature coefficient of magnetic permeability located between a pole of the magnet and the case, with one leg of the member secured to the frame adjacent one of the rabbets therein and extending between the magnet and the case in substantially parallel, spaced relation to the adjacent leg of the magnet, and with the other leg of the member extending between the first leg thereof and the case in substantially parallel, spaced relation to the latter.

2. In a magnetic measuring instrument, a magnet, a member in the magnetic field of the magnet and adapted to be influenced thereby to effect indications of the instrument, a supporting member, and means to shunt a portion of the magnetic flux away from said first-mentioned member including a U-shaped member of magnetic material having registering openings through the legs thereof, and means adapted to be inserted bodily and entirely through the opening in one leg and partially through the other leg and into said supporting member to secure said U-shaped member to the supporting member.

In testimony whereof I affix my signature.
JOSEPH ZUBATY.